United States Patent [19]

Clem

[11] 3,880,020

[45] Apr. 29, 1975

[54] MAKING BLADES FOR TIRE CURING MOLDS

[75] Inventor: Dennis W. Clem, Suffield, Ohio

[73] Assignee: The Goodyear Tire & Rubber Company, Akron, Ohio

[22] Filed: June 6, 1973

[21] Appl. No.: 367,655

[52] U.S. Cl. .................. 76/104; 29/568; 72/324; 83/552; 83/700
[51] Int. Cl..... B21k 11/00; B26d 1/00; B21d 43/28
[58] Field of Search ............ 83/550, 551, 560, 549, 83/698, 700, 552; 29/568; 72/324, 320

[56] References Cited
UNITED STATES PATENTS

| | | | |
|---|---|---|---|
| 2,399,198 | 4/1946 | Brandes | 83/550 X |
| 3,449,991 | 6/1969 | Daniels | 83/552 X |
| 3,452,632 | 7/1969 | Brolund | 83/698 X |
| 3,465,409 | 9/1969 | Brosseit | 72/324 |
| 3,512,435 | 5/1970 | Bossmann et al. | 83/549 X |
| 3,628,231 | 12/1971 | Pancook | 29/568 X |
| 3,638,523 | 1/1972 | Yasuda | 83/700 |
| 3,727,442 | 4/1973 | Ridgway et al. | 29/568 X |
| 3,765,291 | 7/1971 | Stenfeldt | 29/568 X |

Primary Examiner—Harrison L. Hinson
Attorney, Agent, or Firm—F. W. Brunner; R. S. Washburn

[57] ABSTRACT

A commercial four-pillar hydraulic press is modified to accommodate a plurality of subpresses each mounted on a compound slide supported on a surface of a bed plate secured to the bolster of the press. Blade-making stock is carried progressively through the subpresses to be blanked and formed progressively thereby. The stock is held and is moved by a carrier, the stock being pre-perforated along one edge to permit securing the stock progressively and at closely spaced intervals to the carrier. Auxiliary presses held by a frame mounted on the bed plate operate in timed relation with the main press to form and to cut off completed blades from the stock while the same remains engaged with the carrier. To reset each of selected subpresses relative to the stock on the carrier, a motor driven positioner is moved to engage successive ones of the subpresses of the compound slides carrying the subpresses and to move each subpress to a position appropriate to the style of blade being blanked out and formed in which new positions and subpresses are held only by the hydraulic pressure of the press. At the completion of a production lot of blades, the subpresses are released by the ram and each compound slide is collected by mechanism which returns each subpress to a predetermined home position from which the subpresses are again engaged and relocated by the positioner mechanism. The carrier is driven stepwise by a selsyn-type motor. The positioner mechanism has two selsyn motors one of which moves a traveler parallel to the direction of motion of the carrier and a second which moves the respective subpresses one at a time normal to the direction of motion of the carrier. The respective motors and other functions in the apparatus are controlled in response to a conventional numerical control unit reading a prepared program from a punched tape.

The foregoing abstract is not to be taken as limiting the invention of this application, and in order to understand the full nature and extent of the technical disclosure of this application, reference must be made to the accompanying drawing and the following detailed description.

85 Claims, 11 Drawing Figures

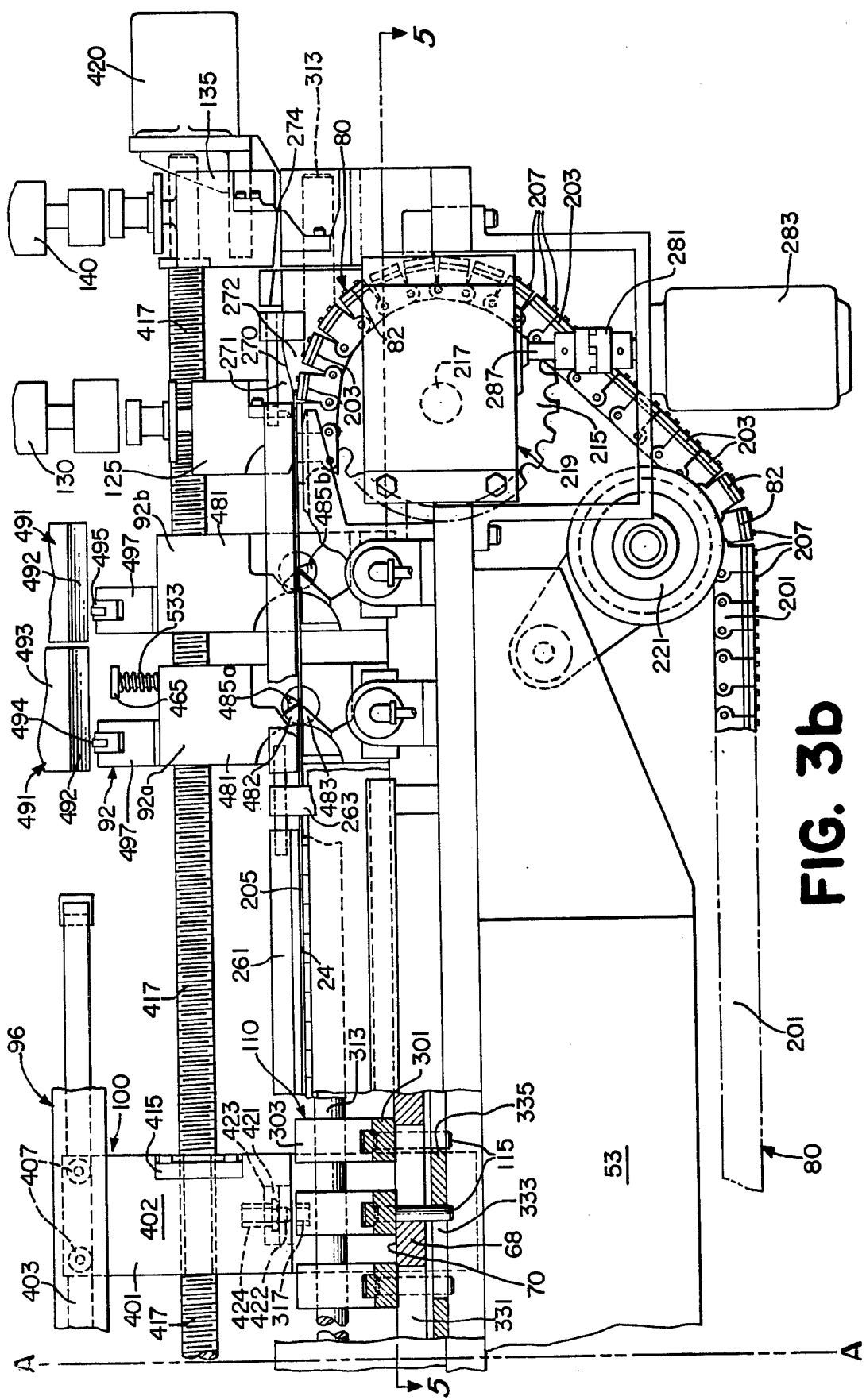

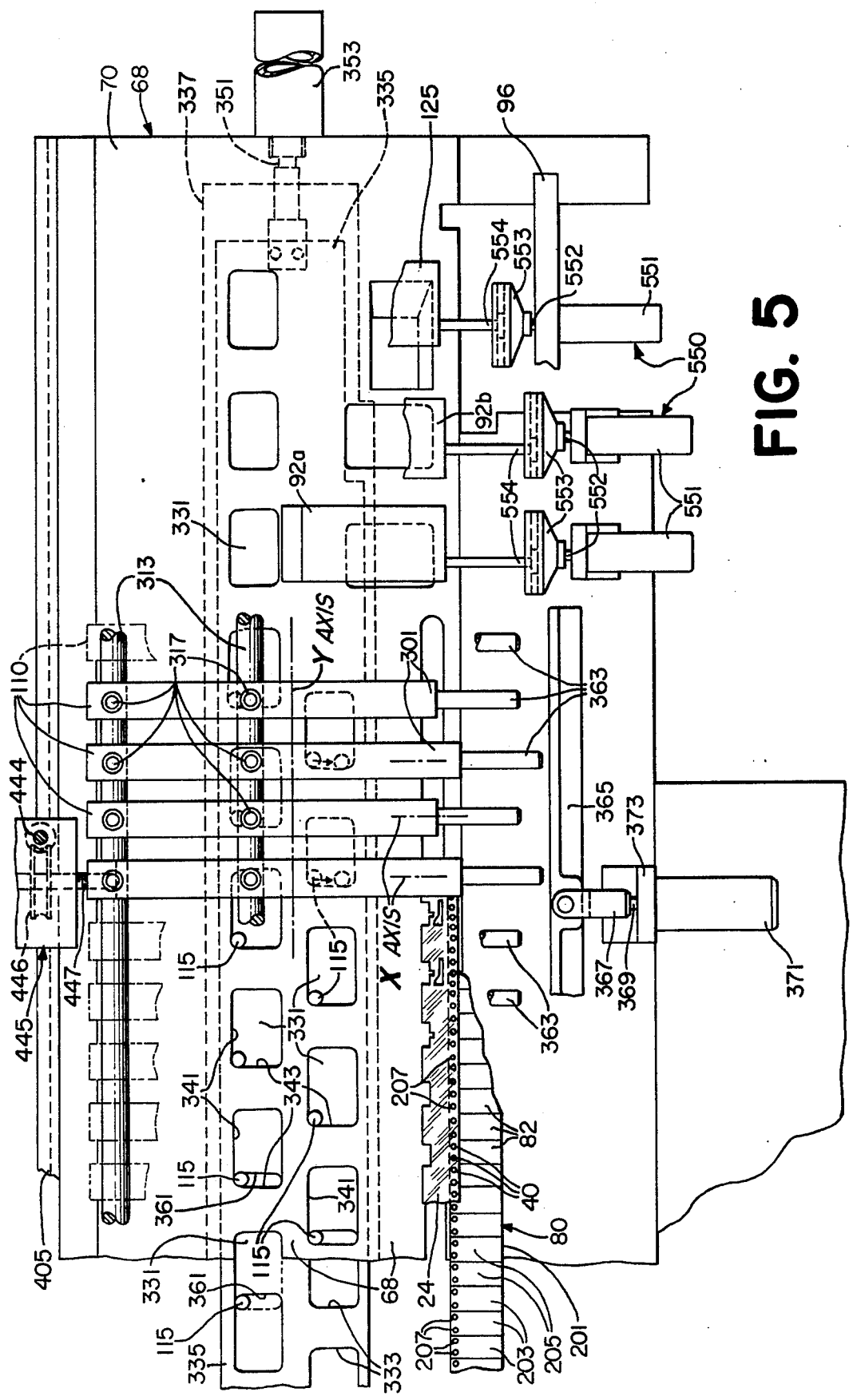

MAKING BLADES FOR TIRE CURING MOLDS

BACKGROUND OF THE INVENTION

Blades for tire curing molds are well known in the art of tire manufacture. The total quantity of such blades made and used in the tire curing molds required by the industry is great; however, the quantity or lot required for any particular style of blade seldom exceeds a few hundred at any one order. The cost of providing conventional tooling to manufacture the blades required is, therefore, considered to be excessive, as is the time required to provide such tooling.

SUMMARY OF THE INVENTION

The present invention aims to minimize the mentioned disadvantages of the prior art and to provide improved methods and apparatus for producing small quantity lots of a multiplicity of differing styles of blades rapidly and economically.

Briefly summarized, the invention particularly pointed out in the appended claims, comprises combinations of several inter-related aspects. In accordance with one aspect of the invention, blade-making stock is carried stepwise by means of an endless looped carrier into operative relation with a plurality of punch and die sets by which individual blades are blanked out in the stock which remains secured at closely spaced intervals to the carrier. In accordance with another aspect of the invention, a plurality of subpress units each accommodating a punch and die set are moved from one to another predetermined position in response to a program of command signals carried by a numerical control tape. Means for accomplishing such movement comprises a positioner mechanism including a traveler selectively engageable to move at least one selected subpress unit from a home position to a second position relative to said stock in response to such command signals.

In accordance with a further aspect of the invention, a plurality of subpress units are provided in a commercial hydraulic press and are slidable both parallel and perpendicular to the direction of movement of blade-making stock, each unit being so movable independently of other such units between one and another predetermined position. Means for so sliding the respective subpress units comprise a compound slide associated with each subpress unit and having a member slidable only parallel to the direction of stock movement and a second member slidable only in the direction perpendicular to such stock movement.

In accordance with an additional aspect of the invention, a plurality of subpress units in the press are collected and are moved individually to respective home positions. Means for accomplishing such movement comprises a collector mechanism movable to engage a locating element connected respectively to each said subpress unit and movable to place each such element in its predetermined home position in the press.

In a still further aspect, the invention comprises at least one auxiliary press operable in timed relation with the hydraulic press, and a blade bending device cooperable with such auxiliary press to bend a portion of a blade angularly with respect to the plane of the stock while such blade remains integrally connected with said stock.

To acquaint persons skilled in the art with the principles of the invention and with the above broadly stated aspects and illustrative combinations in accordance therewith, the following description of a presently preferred embodiment and of a preferred mode of use according to the invention is described herein, making reference to the annexed drawings in which:

THE DRAWINGS

FIGS. 3a and 3b are together an enlarged view in elevation of a portion of the apparatus of FIG. 1, the view being divided at the line A—A;

FIG. 5 is a horizontal sectional view of the apparatus of FIG. 1 taken at the line 5—5 in FIG. 3b;

In the following description of preferred embodiments of the invention, the product described in relation both to the process and to the apparatus is a blade for use in tire curing molds. It will be apparent to persons skilled in the most closely related arts that either the apparatus or the process can, without further invention, be applied to the production of any article similar to the well-known tire blade for tire curing molds.

THE PREFERRED EMBODIMENTS

Figure 1:
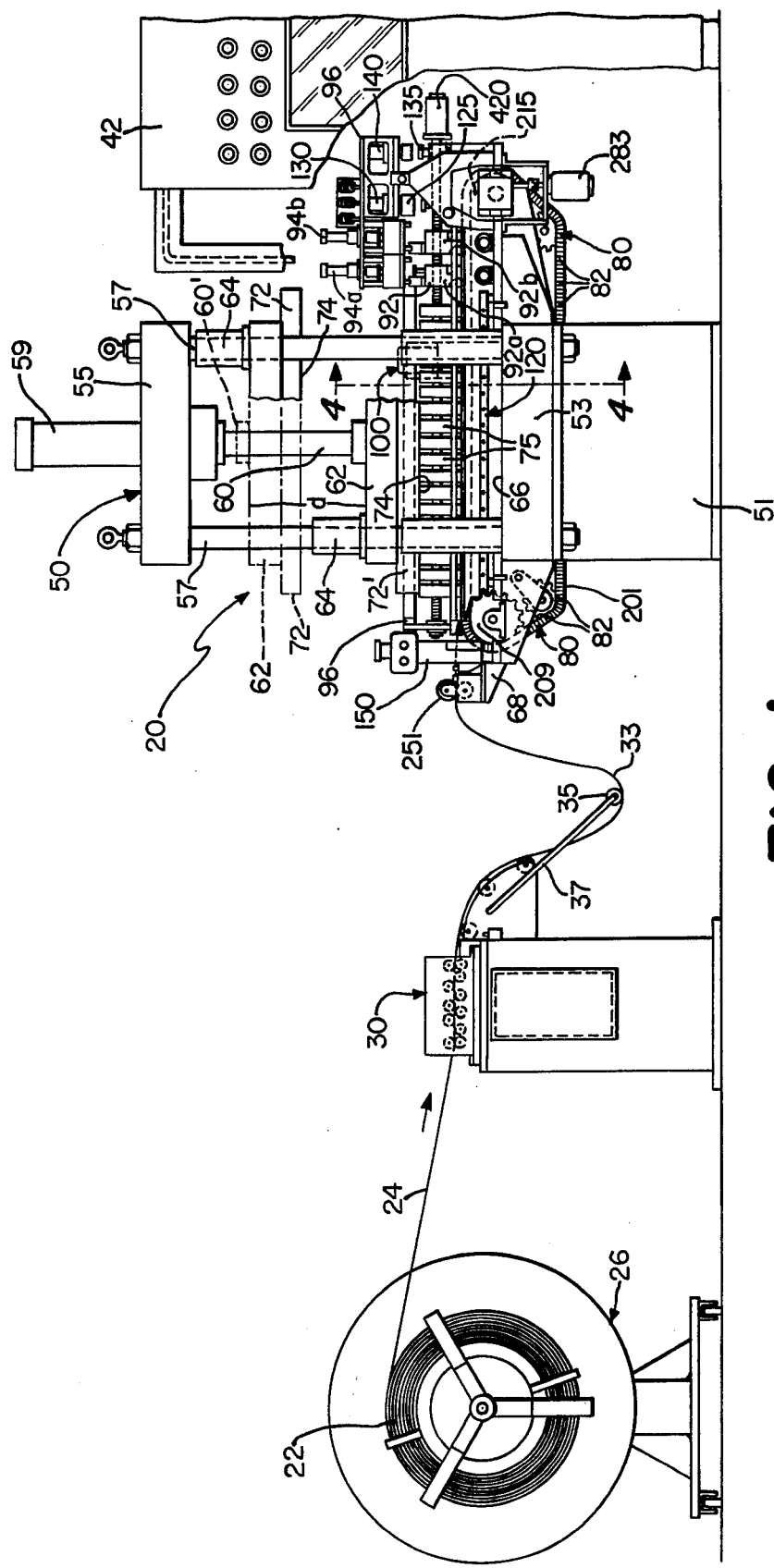
FIG. 1 is a front elevation view of an apparatus according to the invention.
Figure 2:
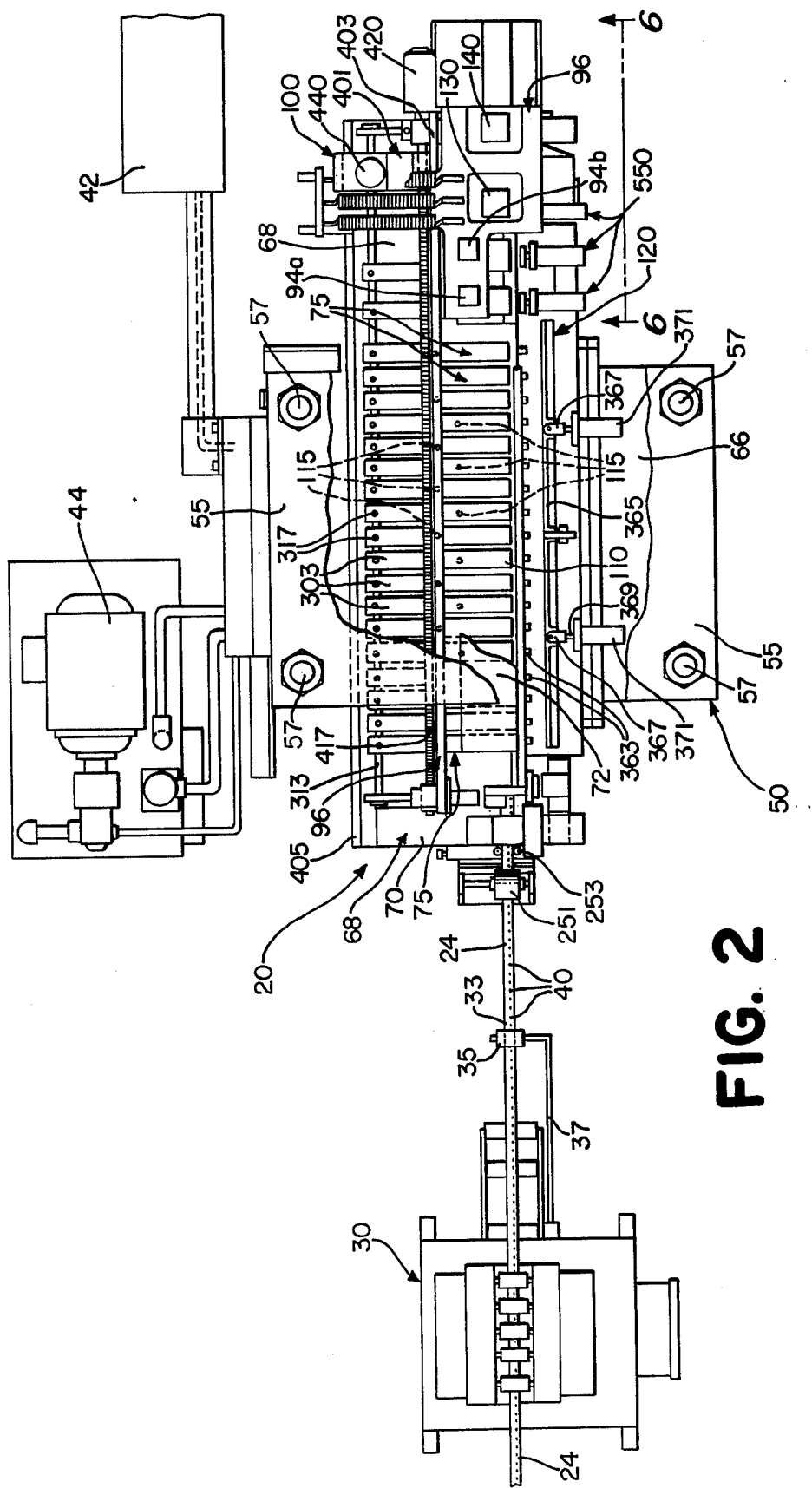
FIG. 2 is a plan view of the apparatus of FIG. 1 portions thereof having been broken away more clearly to show certain features.

An apparatus 20 in accordance with the invention is shown synoptically in the drawings, particularly in FIGS. 1 and 2. A summary description of the principal features thereof is given first; the several aspects and features are then separately described in greater detail below. A wound coil 22 of suitable blade-making stock 24 is mounted on a conventional unwind reel stand 26. The stock extends from the coil to a conventional power-driven stock straightener 30 operable to unwind the stock from the reel and to feed a running length of stock into the loop 33. The length of stock maintained in the loop is controlled between preset limits in response to a dance roll 35 mounted on an arm 37 pivoted on the straightener and actuated in response to the position of the dance roll 35 in the conventional manner.

A suitable useful stock for making blades for tire curing molds is a running length of metallic, commonly a stainless steel, strip, of from 0.020 to 0.040 inches in thickness and from one-half to 1½ inches in width. It will be understood that both material and dimensions can be selected as desired and the examples given are merely representative and not in the nature of limitation of the invention. In the preferred embodiments the stock 24 used is perforated, that is to say, provided with a continuous longitudinal row of holes 40 uniformly spaced parallel to and close to the near edge of the stock as seen in FIGS. 1 and 2.

In the preferred apparatus 20, the actuations of the components and elements to be described are preferably made subject to control by a commercial control unit 42 capable of communicating command signals in accordance with a predetermined program. The unit 42 includes a tape reader and an indexer, and is available as an assembled unit from Superior Electric Company of Bristol, Conn. The tape reader accommodates a multi-channel tape carrying a part of such program for repositioning selected subpresses with punch and die sets therein as will be described. The preset indexer provides signals or pulse counts for control of stepwise advance of the stock according to such program. The control unit 42 is not further described, inasmuch as it is not within the scope of the present invention.

Hydraulic pressure for effecting various movements in the apparatus 20 is provided by a conventional hydraulic power pack 44, a further description of which here should not be necessary.

The apparatus 20 is built into an otherwise conventional hydraulic press 50 having a base 51 which supports a fixed lower bolster 53 and a fixed head plate 55 which are secured in appropriately spaced parallel relation by four press pillars 57. A press ram operating cylinder 59 is fixed vertically on the head plate and contains a main ram 60 operated hydraulically to move perpendicularly of and toward and away from the lower bolster in response to controlled variations of fluid pressure in the cylinder 59. Fixed to the main ram is a press platen 62 having bushings 64 slidably engaging the respective pillars so that the platen moves perpendicularly with respect to the surface 66 of the lower bolster.

A bed plate 68 having a plane upper surface 70 parallel to the lower bolster surface 66 is secured rigidly to the bolster. A punch operating beam 72 is fixed to the platen 62 and has a lower surface 74 extending parallel to the surface 66.

A plurality of subpress units 75 are each supported for movement parallel to the surface 70 of the bed plate independently of each other. Each unit 75 comprises a punch holder 75a, a die block 75b, and a pair of guide pins 75c (refer to FIG. 4). Each subpress unit 75 accommodates a conventional punch and die set 76 adapted to form or blank out a particular portion of blade in accordance with the program on the tape in the reader. Punch and die sets are commonly referred to as die-sets and for brevity are so called herein.

In accordance with the invention, the stock is held at closely spaced intervals along its own length and is, while so held, conveyed stepwise through the apparatus, being held stationary during the punch operating or down stroke of the main ram 60 and being moved forwardly (toward the right in FIG. 1) one step at a time, the measure of which step is fixed in accordance with the program, between operating strokes of the main ram. To hold and to convey the stock, a carrier 80 comprising a plurality of stock holding fixtures 82, arranged in end-to-end relation to form an elongated loop, is mounted on the press 50 for movement along a closed path so as to locate each fixture and each blade being blanked progressively in operative relation with each of the die sets 76 being used.

To provide one or more bends in blades which have been blanked out by the die sets 76, at least one additional subpress unit is a blade bending device 92, there being two such devices 92a, 92b provided in the apparatus 20. These additional subpress units are operated, not by the main ram but by at least one auxiliary press 94, there being two, 94a, 94b in the apparatus 20, mounted on a frame 96 which is secured to the bed plate 68. Each has an auxiliary ram 98a, 98b which is operable hydraulically in timed relation with and parallel to the main ram 60. Each unit 92a, 92b is capable of bending a portion of an already blanked blade.

During operation of the apparatus to produce a plurality of like blades, each of the subpress units 75 is held in its position by the punch actuating beam 72 which is moved by the ram 60 a primary distance, d, toward the bed plate 68 for the purpose. The subpress units 75 and the punches (not shown) of the respective die sets 76 are then actuated to blank out successive blades by a rapid, small, cyclic displacement of the ram 60 coordinated with successive stepwise movements of the carrier 80.

A further feature of the invention is that of rapidly and automatically resetting or repositioning selected subpress units in accordance with an N/C program contained in the tape so as to position the die sets for successive different blade designs or styles. The die sets, being of standardized shapes, are not exchanged but are simply relocated so that any desired shape of blade can be blanked out by a suitable positioning of the standardized shapes of the several die sets. The individual die sets can, should it become desirable, be relocated manually and conventionally, when the N/C unit is not activated.

In order to reset the respective subpress units in accordance with a program provided for such different blade, a positioner mechanism 100 is mounted in the frame 96 and operable to move selectively at least one of the subpress units from one to another predetermined position relative to the ram 60 and relative to the carrier 80.

To facilitate movement of the subpress units, as by the positioner mechanism 100, each of the units is mounted on a compound slide 110 so that, with the main ram raised to its up position, indicated at 60' in FIG. 1, each of the subpress units can be slidably adjusted in directions parallel and perpendicular to the direction of movement of stock, i.e., in both x and y directions. Each of the compound slides 110 is slidable independently of the others of the compound slides, thus permitting each slide to be adjusted from a first position to a second position independently of any of the others by the positioner mechanism 100.

A locating element 115 is fixedly connected to each subpress unit. In the apparatus 20 an element 115 is fixed on each of the compound slides 110 to cooperate with a collector mechanism 120 which is mounted in the press 50 and is movable to engage the respective locating elements 115 and to move each element and its respectively associated subpress unit to a predetermined home position on the bed plate 68.

A further subpress unit 125 slidably mounted on the bed plate and the ram of a further auxiliary press 130 mounted on the frame 96 cooperate to cut off a completed blade from the running length of stock 24 at each cycle of the main ram 60. The completed blades so cut off are dropped from the cut-off subpress 125 into a convenient chute (not shown) for collection in a conventional manner.

After completed blades have been cut from the running length of the stock 24, the uncut strip remaining is then disengaged from the carrier 80. After such disengagement, the strip, now scrap, can be disposed of in conventional manner. In the apparatus 20 a scrap cut-off unit 135 fixed on the bed plate 68 is actuated by the ram of an auxiliary press 140 mounted on the frame 96 to cut such scrap into readily disposable pieces.

To sever the stock 24 being worked by the apparatus 20 from the stock being fed to the machine a conventional cut-off unit 150 is fixed on the bed plate 68 and is operable to cut the incoming stock in response to signals provided by the Indexer of the unit 42 when a preset number of increments of stepwise movement, corresponding to a predetermined number of blades or an equivalent length of stock has entered the apparatus. In this way the stock being worked, by virtue of being held by the carrier 80 at closely spaced intervals, can be worked into completed blades all the way to the end cut-off by the unit 150.

For convenience in description, the term, y-axis, as used herein refers to a reference line y—y parallel to the direction of movement of the stock being worked in the apparatus; the term, x-axis, will be understood to mean a direction or directions perpendicular to the y-axis. Both x and y-axes are horizontal or at least parallel to the surface 70 of the bed plate. The term, home position, as applied to the respective subpress units will be understood to mean that position to which such subpress units are moved by the collector mechanism 120. Such home position can also be understood to be that position of the respective subpress units where x equals 0 along the respective x-axis and y equals 0 with respect to a particular subpress unit. The positioner mechanism 100 is arranged and constructed to "find" a respective subpress unit, and specifically its associated compound slide 110, when the same are in or are very close to their respective x equals 0 and y equals 0 positions or "home" and from such home position to move the respective compound slide and the associated subpress unit to another position in which x equals $x_n$ and y equals $y_n$, $x_n$ and $y_n$ being the respective coordinates of the new position relative to the home position, in accordance with a prepared program contained in the numerical control tape.

The Stock Carrier

Figure 3A:
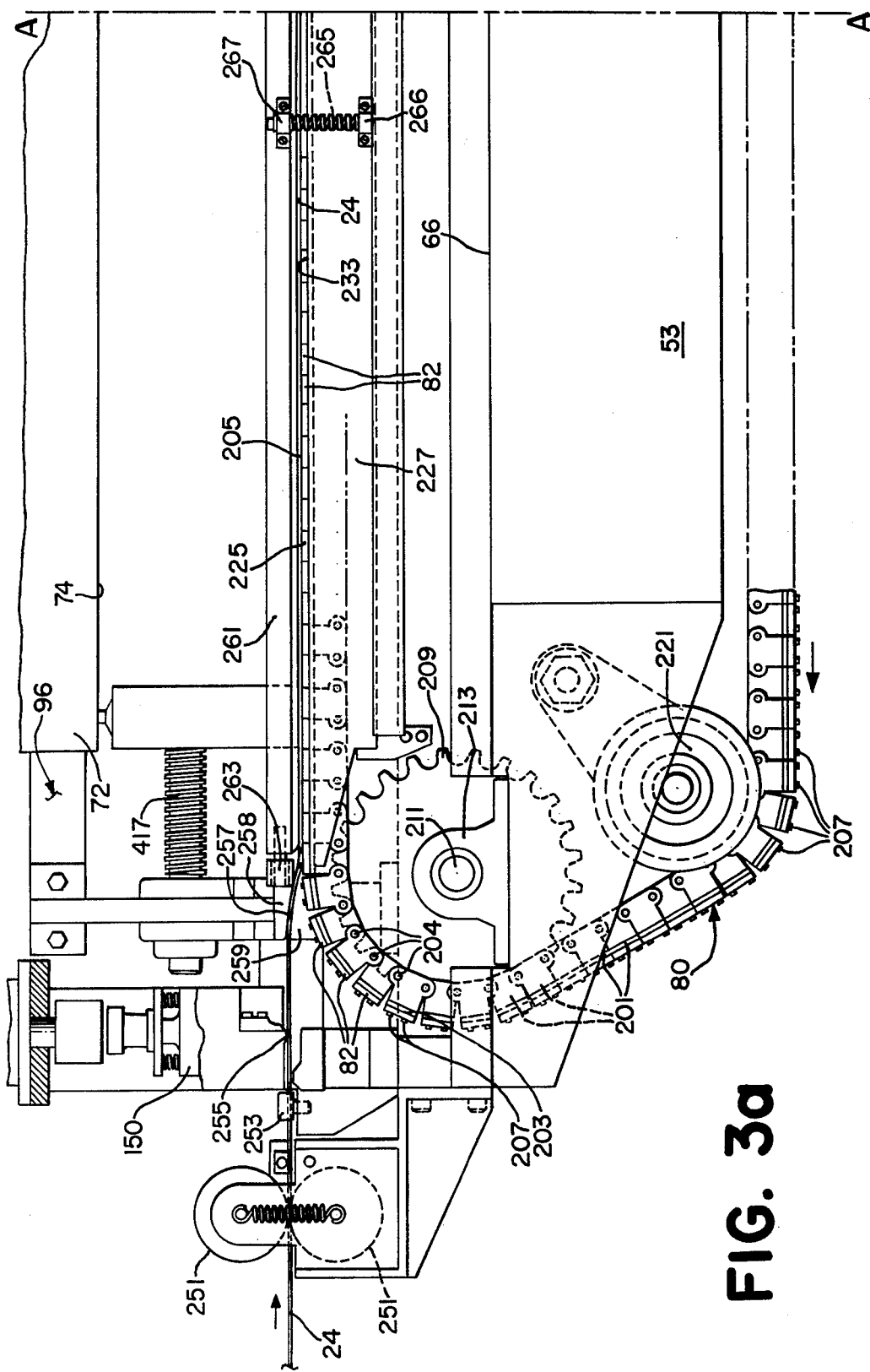
Figure 4:
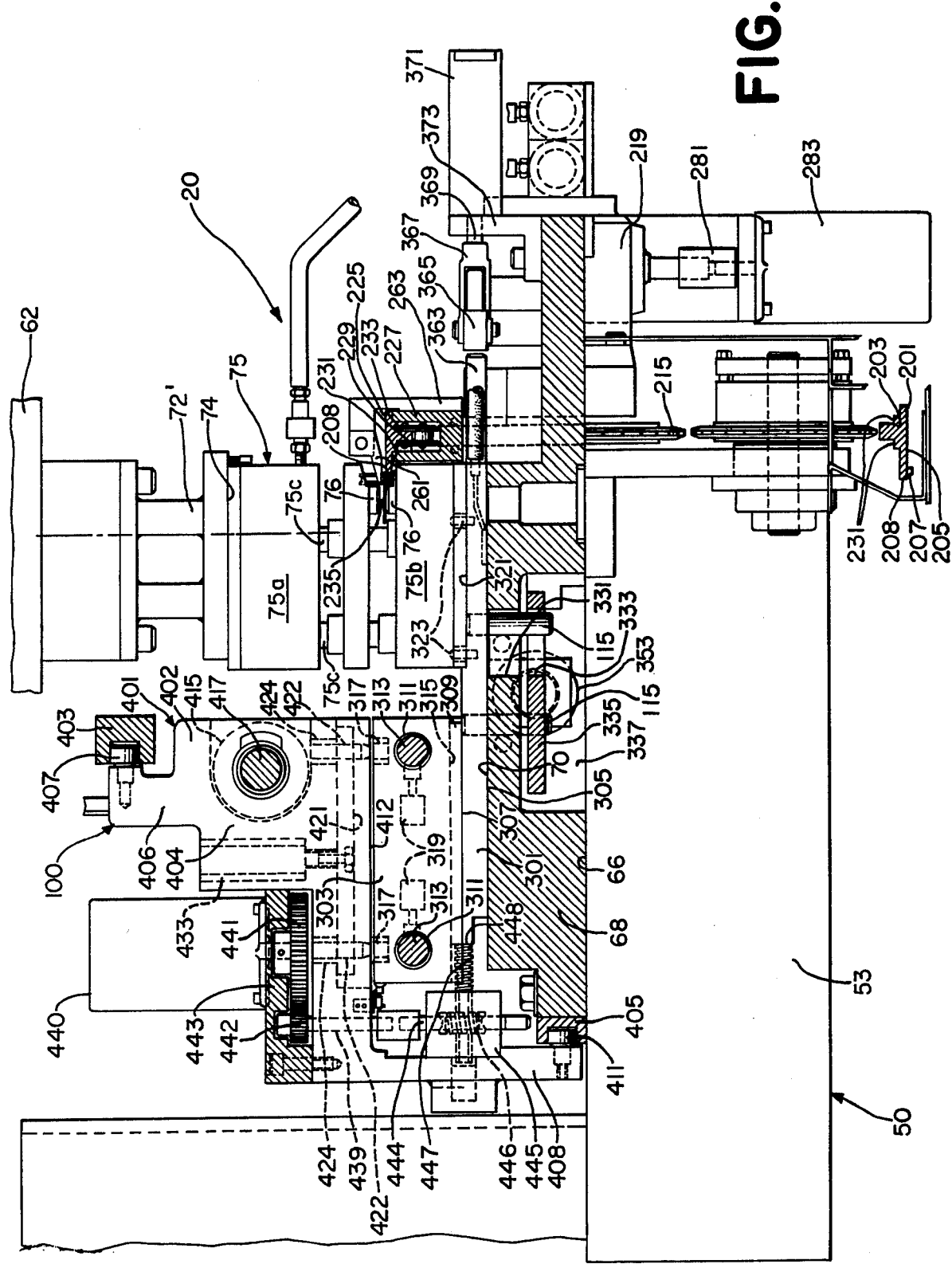
FIG. 4 is a view in cross-section of the apparatus of FIG. 1 taken at the line 4—4 therein.

Referring particularly to FIGS. 3a, 3b, and 4; the stock holding and conveying carrier 80 of the apparatus 20 comprises a chain-like series 201 of precision machined segments 203, each of which forms a holding fixture 82. The segments 203 are pivotably joined by accurately positioned pins 204 in the manner of conventional roller chain and with a high degree of precision to provide accuracy of the level and coplanar surface 205 of the fixtures 82. Each fixture 82 has a pair of register pins 207 fixed normal to the surface 205, spaced uniformly along the chain at the same pitch as the pitch or spacing of the holes 40, and inwardly of the edges 208 of the segments. These pins 207 register in the holes 40 provided in the stock at uniform intervals along its length and a small and uniform distance inwardly from the edge thereof which is the near edge of the stock as seen in FIGS. 3a and 3b. The stock traveling through the apparatus is thus accurately held at closely spaced intervals at least approximating the spacing of individual blades and is moved by the carrier 80 rather than by pushing or pulling the stock itself into or out of the line-up of progressive dies as is customary in the prior art.

Near the left end of the apparatus, FIG. 3a, the chain 201 turns about an idler sprocket 209 mounted on a shaft 211 supported by bearings 213 fixed to the press bolster 53. Near the right end of the apparatus, FIG. 3b, the chain turns about a driving sprocket 215 mounted on the output shaft 217 of a right-angle drive gear box 219 fixed on the bolster. The shafts 211 and 217 are parallel to each other and to the surface 70 of the bed plate so that the chain travels in a plane parallel to the y-axis and perpendicular to the, or each, x-axis. The sprockets 221 are mounted adjustably on the bolster 53 to engage the chain and are adjustably fixed to afford suitable tension in the chain 201. The "chain" or series of segments 203, as well as each of the sprockets 209, 215, and 221, are preferably constructed and assembled with precision such that equal increments of rotation of the driving unit presently to be described will provide consistently equal increments of linear movement of the chain 201. An upper reach 225 of the chain is supported for straight line travel parallel the y-axis by a rigid rail 227 having an open top channel 229 formed longitudinally therein. The rail 227 is secured rigidly to the bed plate 68 and extends between the sprockets 209 and 215. The lower surfaces 231 of the segments slidably engage the upper surfaces 233 on the rail 227 so that the former (231) are movable only along the y-axis in end-to-end coplanar relation. The surfaces 205 of the segments cooperate to support the stock for movement transversely of the die sets 76 at an elevation only slightly above the respective dies. The stock extends laterally from the segments into the throat 235 or space beneath the respective punches. The register pins 207 extend normally from the surface 205 a distance commensurate with the thickness of the stock, e.g. about 0.040 inch. Each of the pins is sized to enter neatly and to register with a mating hole 40 in the stock.

At the left or entrance end, FIG. 3a, incoming stock is received from the previously mentioned loop 33 and passes between a pair of pinch rolls 251 which may be spring-loaded, between a pair of edge guide rollers 253 by which the width of the stock is located in suitable lateral direction (in the x-direction). The stock then passes through the work space or throat 255 of the previously mentioned infeed cut-off unit 150 and enters an S-shaped channel 257 formed by the opposing S-curved surfaces of an upper 258 and a lower 259 channel block, each fixed on the rail. The S-channel 257 serves to flex the incoming stock sufficiently so that the register pins 207 carried by the successive segments 203 mate smoothly with the register holes 40 in the incoming stock. The stock is thus secured to the segments at closely spaced intervals. As best seen in FIG. 4, the stock extends laterally beyond the segments by an amount at least equivalent to the full height of the blades to be blanked by the punch and die of the respective subpress units 75. (The height of a blade is measured radially of the mold in which it will be used.) To prevent the stock from being lifted off the pins 207, a hold-down bar 261 extending parallel to the y-axis is carried by brackets 263 fixed on the rail 227 to extend along and over, in closely spaced relation to, the row of register pins 207. The bar 261 is mounted on pins held by the brackets 263 to pivot about its own longitudinal axis parallel to the y-axis and is urged toward the segments 203 and stock thereon by a spring 265 carried by a bracket 266 fixed to the rail 227 and an extension arm 267 fixed on the hold-down bar 261.

To disengage the running length of strip remaining after completed blades have been cut therefrom, a second S-channel 270, at the right or exit end, FIG. 3b, is formed by the S-shaped surfaces of the blocks 271, 272 fixed on the rail 227. This S-channel 270 operates to flex and lift the now scrap strip portion of the stock from the pins 207. From the S-channel 270 the strip traverses the throat 274 of the scrap cut-off unit 135.

In order to drive the carrier 80 and to move the stock carried by the segments 203 in uniformly controlled stepwise increments, the drive gear box 219 is connected by a conventional coupling 281 to an electrical driving motor 283. In the apparatus 20, the motor 283 is a "Slosyn" (T.M.) driving motor sold by Superior Electric Co., of Bristol, Conn. Starting, degree of rotation, and stopping of the motor 283 are controlled by command signals to the motor from the unit 42.

Compound Slides

Continuing reference to FIGS. 3a, 3b, and 4; each of the subpress units is carried, for movement in both $x$ and $y$ directions, by one of the plurality of compound slides, each of which slides is slidably supported on the surface 70 of the bed plate. Each slide 110 comprises a rectangular $x$-slide bar 301 and a rectangular $y$-slide bar 303. The $x$-slide bar has a plane surface 305 which can slide on the bed plate surface 70. The upper surface 307 of the $x$-slide bar is provided with a key 309 fixed integrally to and extending longitudinally of the top surface of the $x$-slide bar. The $y$-slide bar has slide surfaces in the form of a pair of bushings 311, each of which is slidable along a guide surface provided by a guide rod 313. The guide rods are fixed in the frame 96 parallel to the surface 70 and to the $y$-axis such that each $y$-slide bar 303 can move only in the $y$-direction. A keyway 315 extending longitudinally of the $y$-slide bar and parallel to the $x$-axis guides the key 309 of the $x$-slide bar so that the $x$-slide bar can move only in the $x$-direction. In its upper surface, each $y$-slide bar has a pair of latch pin receiver sockets 317.

Optionally, and desirably used in association with the auxiliary presses 94 and 130, the $y$-slide bar 303 may be provided with hydraulic or electromechanical clamps 319 operable to engage the rods 313. Such clamps 319 clamp and release the associated $y$-slide bar to and from the rods 313 and can be operated either manually or in response to command signals incorporated in the program on the N/C tape. Each $x$-slide bar is provided with a subpress seating surface 321 and with a pair of locating dowels 323 or their equivalent. The respectively associated subpress 75 will rest on but not otherwise be fastened to the $x$-slide bar and is thus readily removed or replaced without necessity for being otherwise fastened to the compound slide.

Collector Mechanism

In the apparatus 20, each $x$-slide bar 301 is provided with a locating element in the form of a locating pin 115 fixed therein and extending downwardly through an aperture opening 331 in the bed plate 68 and into an aperture 333 in a collector plate 335, which is part of the collector mechanism 120 and is movable to engage and to move each locating element 115 and its respectively associated subpress unit to its predetermined home position on the bed plate 68. The collector plate 335 is mounted to slide in the $y$-direction lengthwise in a cavity 337 extending longitudinally of the bed plate 68 and spaced downwardly from the bed plate surface 70. As best illustrated in FIG. 5, the bed plate is provided with a plurality of openings 331, generally rectangular in the apparatus 20, each of which has an $x$-locating side 341 and a $y$-locating side 343, the openings 331 in the bed plate being associated respectively with individual compound slides 110. Each opening accommodates the locating pin 115 of an individual associated slide 110. The openings in the bed plate and in the collector plate are arranged in parallel rows and offset longitudinally, as shown in FIG. 5. The piston rod 351 of a cylinder 353 fixed on the bed plate 68 is connected to the collector plate 335 and is actuated, in response to a signal from the N/C unit 42 to move the plate longitudinally. Each of the generally rectangular openings 333 in the collector plate 335 has a wall 361 which is engageable with the associated locator pin 115 and, on movement of the plate 335 toward the left in FIG. 5, moves the locator pin 115 therewith toward the left and into contact with the $y$-locating side 343 of the associated opening 331 in the bed plate 68. Thus, at one movement, each of the compound slides 110 and the respectively associated subpresses are "collected" and each is moved to its home position from its previous position.

While the collector plate 335 described could be employed, e.g. by minor modifications of the shapes of the openings 333, to move the respective compound slides to both their respective $x$ equals zero and $y$ equals zero positions; in the apparatus 20, each compound slide has an extension in the form of a rod 363 fixed in and extending forwardly from the $x$-slide bar 301 in the $x$-direction. An $x$-collector bar 365 extending generally parallel to the $y$-axis is carried by the clevises 367 fixed on the piston rods 369 of the air cylinders 371 fixed by the brackets 373 on the bed plate 68. The bar 365 is moved in the $x$-direction by the cylinders 371. The $x$-collector bar can engage the rods 363 of the respective compound slides 110 to move them, in the $x$-direction, toward their respective home positions. The locator pins 115 are thereby moved to contact the $x$-locating sides 341 of the respectively associated openings 331, thus locating each associated subpress at its $x$ equals zero position. By use of both of the independently operable $x$-collector bar 365 and $y$-collector plate 335, the respective compound slides 110 and the subpress units mounted thereon can be moved simultaneously to their home positions in response to appropriate signals included in the program. The openings respectively in the bed plate and in the collector plate are sized and located such that the respective locating pin 115 is spaced away from both the $x$-locating side 341 and the $y$-locating side 343 and free of contact with the walls defining the openings when the respectively associated subpress unit is in a working position relative to the stock being operated upon.

Positioner Mechanism

Referring again to FIGS. 3a, 3b, and 4; the positioner mechanism 100 is mounted on the press 50 and operable selectively to move at least one of the subpress units from one to another predetermined position. The mechanism 100 comprises a traveler 401 which is movable into operating relation with successively selected ones of the subpress units 75 and is there engageable to move such selected unit from the one to the other position. A frame 96 secured on the bed plate provides a pair of tracks 403, 405 extending parallel to the $y$-axis and the surface 70. The rigid body 402 of the traveler 401 has plane vertical parallel sidewalls, a central body portion 404 having an integral upper flange 406 with a pair of guide rollers 407 rotatably mounted thereon, and an integral lower rear flange 408 in which a similar pair of rollers 411 are mounted. The rollers 407 travel in the track 403 and the rollers 411 travel in the track 405 as the traveler 401 is moved, in the $y$-direction, parallel to the direction of movement of the carrier 80. The plane surface 412 of the portion 404 is parallel to and spaced slightly above the plane of the top surfaces of the $y$-slide bars 303 to allow free relative movement therebetween. The flange 408 is spaced away from the $y$-slide bar.

To move the traveler 401 longitudinally, parallel to the $y$-axis, a nut 415 fixed in the traveler body 402 cooperably engages a rotatable screw 417 mounted in the frame 96 to extend parallel to the $y$-axis. The screw is coupled to a Slosyn (T.M.) driving motor 420 like that previously identified, secured on the frame 96. This motor is started and stopped in response to command signals from the tape reader of unit 42. Traveler 401 is thereby movable in the $y$-direction in precise proportion to the angular rotation of the screw 417 under control of the N/C unit.

To engage the traveler 401 and a selected one of the subpress units 75, a latch plate 421 carrying a pair of latch pins 422 is mounted in a rectangular recess 423 the vertical sides of which are parallel to the $x$-axes. The pins 422 are guided in bushings 424 fixed in the body 402. The plate 421 is lowered and raised in the recess 423 to move the latch pins 422 into and out of engagement with the latch receiving sockets 317 fixed in the selected $y$-slide bar 303 by an air cylinder 433 disposed in the body 402.

The traveler also carries an x-position motor 440, also a Slosyn (T.M.) driving motor of the type previously identified. The motor 440 drives a pair of meshing gears 441, 442. The motor 440 is mounted on a cover plate 443, secured on the body 402, the larger gear 441 being mounted corotatably on the motor shaft. The smaller gear 442 is mounted on a vertical shaft 439 rotatably fixed in the body. The shaft 439 is coupled to the worm shaft 444 of the worm gear jack 445 the worm gear 446 of which is internally threaded to coact with a screw 447 extending and movable in the $x$-direction. The screw 447 is disposed at an elevation above the surface 70 and below the top surfaces of the $x$-slide bars 301 so that, on being extended toward the right in FIG. 4, the screw abuts the end surface 448 of a selected $x$-slide bar. The jack 445 is affixed to the flange 408 of the traveler 401.

The Auxiliary Presses

Figure 7:
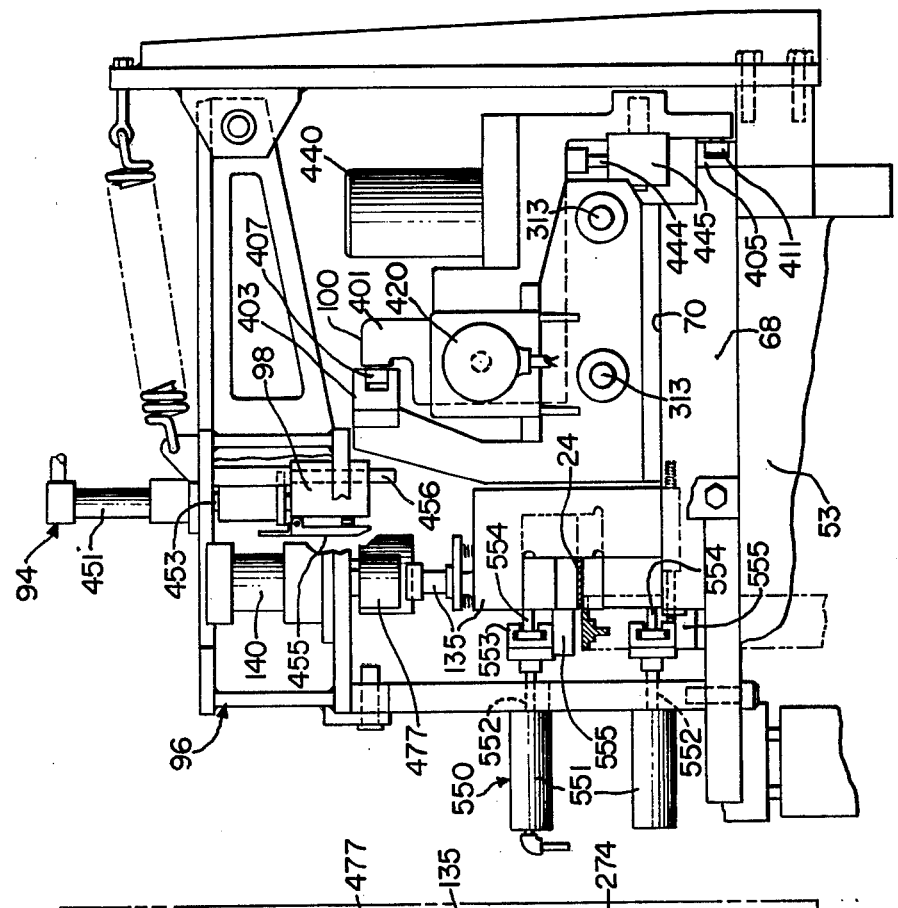
FIG. 7 is a view in side elevation of the apparatus of FIG. 1 taken as indicated by the line 7—7 in FIG. 6.
Figure 6:
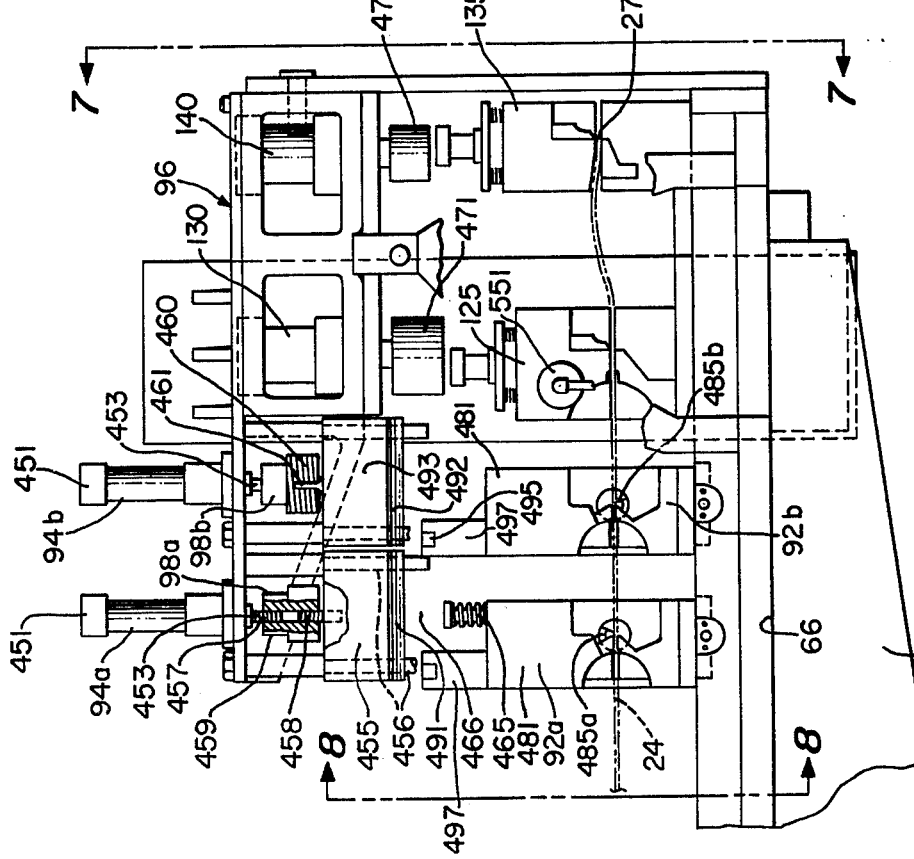
FIG. 6 is a view in front elevation of the apparatus of FIG. 1 taken as indicated by the line 6—6 in FIG. 2.

Referring to FIGS. 6 and 7; in accordance with the invention, the apparatus 20 includes the auxiliary presses 94a, 94b each of which is mounted on the frame 96. Each includes a hydraulic cylinder 451 connected by suitable hydraulic lines with conventional controls to be operated in timed relation with the main ram 60. The two auxiliary presses 94a, 94b each have an auxiliary ram 453 movable along vertical axes in response to hydraulic pressure in timed relation with the main ram to actuate the subpress units 92a, 92b, in the apparatus 20, each of which is a blade-bending device.

To provide convenient adjustment of stroke of the bending device and thereby the angle of the bend formed in the blade being operated on, a crosshead 455 is disposed between each bending device and the associated auxiliary ram. The crosshead 455 is adjustably fixed to the ram and is slidable on guide pins 456 fixed in the frame 96 parallel to the direction of the ram stroke. A threaded member 457 on the ram 453 is connected to a threaded member 458 on the crosshead 455 by a collar 459 having coaxial right-hand and left-hand internal threads. The threads on the respective members 457, 458 are of opposite hands for cooperating with the threads in the collar 459 so that rotation of the collar moves the respective members 457, 458 toward or away from each other. The collar 459 is provided with a helical graduated scale 460 readable with respect to an index finger 461 fixed on the crosshead to display position and degree of rotation of the collar and thus to indicate the amount of displacement of the crosshead 455 relative to the ram 453 as the collar is rotated. The arrangement enables the fixed stroke length of the auxiliary press 94 to effect a variable stroke of the plunger 465 of the bending device 92a by increasing or decreasing the space 466, between the crosshead and the plunger, traversed by the crosshead during its stroke.

The auxiliary press 130 and its ram 471 operate a subpress in the form of a blade cutoff unit 125. The auxiliary press 140 and its ram 477 operate a conventional cutoff unit 135 to sever the scrap strip remaining of the stock at the exit end of the apparatus for suitable disposal. Both cutoff units are conventional in design, although novel in their applications here.

The Bending Devices

Figure 10:
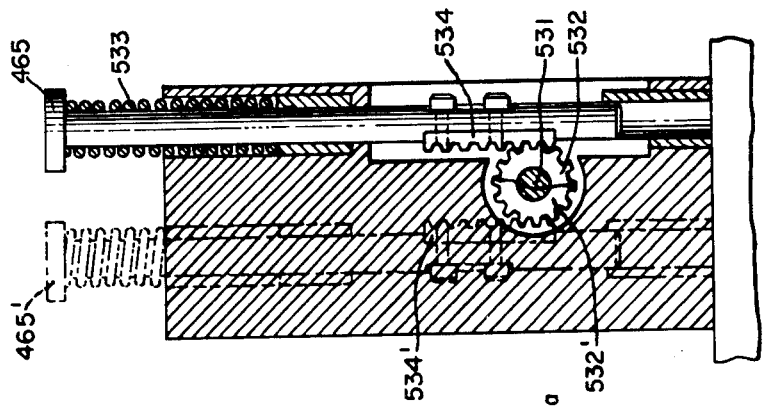
FIG. 10 is a section view of a portion of the apparatus of FIG. 1 taken as indicated at line 10—10 in FIG. 8.
Figure 9:
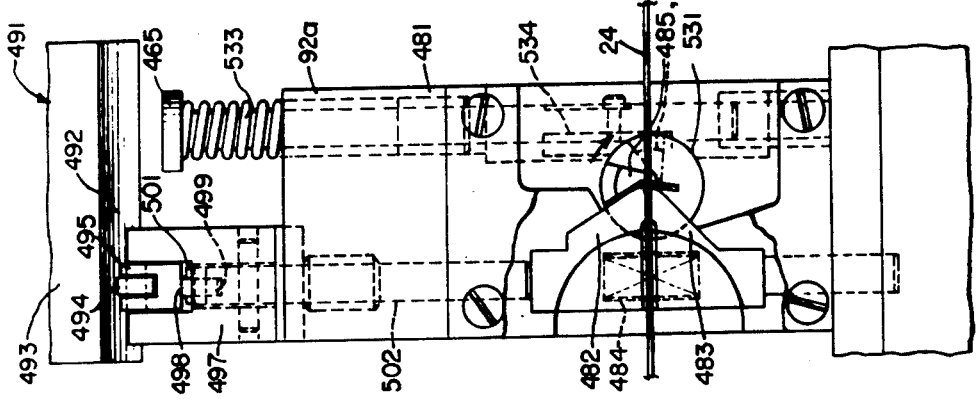
FIG. 9 is a front elevation view, enlarged, of a portion of the apparatus of FIG. 1 taken as indicated at the line 9—9 of FIG. 8.
Figure 8:
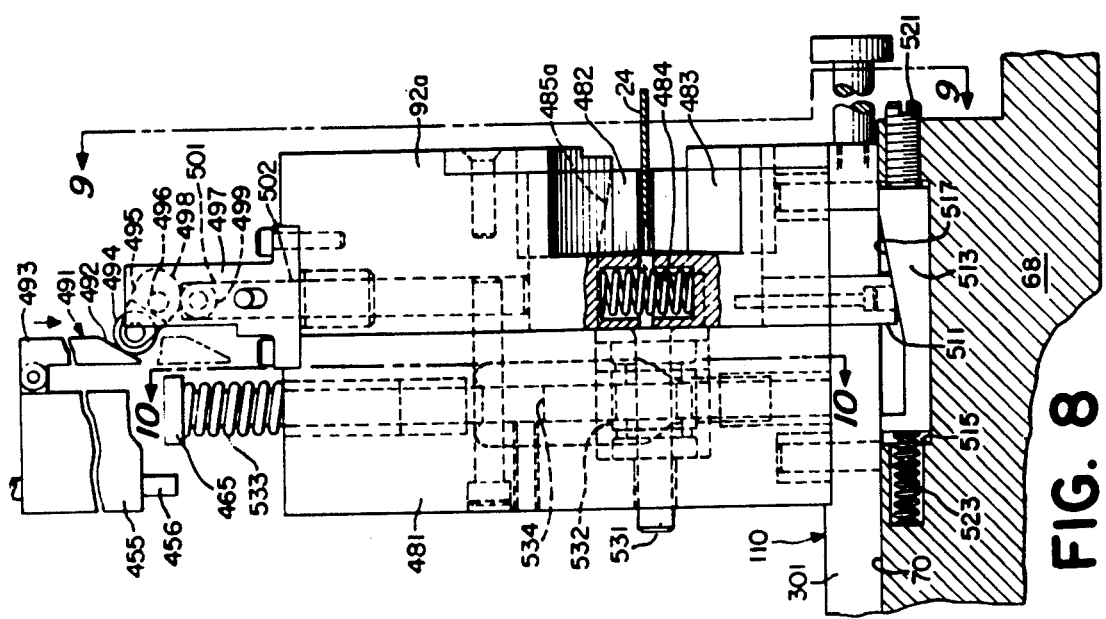
FIG. 8 is a view in cross-section, enlarged, of the apparatus of FIG. 1 taken at line 8—8 in FIG. 6.

Referring to FIGS. 8, 9, and 10; the subpress units associated with the auxiliary presses 94 are specialized units 92a, 92b operable to bend blades already blanked by the die sets 76 which blades remain integrally attached to the stock, the bends being formed about a bend line extending in the $x$-direction. Each bending device 92a, 92b has a rigid upright body 481 which houses a pair of movable jaws 482, 483 urged apart by a spring 484 and a rotatable bending finger 485 which cooperates with the jaws to form a bend in the blade being operated on. The upper jaw 482 is moved toward the lower jaw 483 to grip a portion of a blade. A jaw operating plate 491 carried by the crosshead 455 has a first surface 492 inclined relative to the direction of its movement and a second surface 493 extending from the first and parallel to its movement. As it is moved downwardly the plate 491 engages a roller 494 mounted in the yoke 495. The first surface 492 urges the roller 494 and yoke 495 clockwise in FIG. 8. The second surface 493 holds the roller 494 in the so-displaced location. The yoke pivots about a pin 496 in a bracket 497 affixed to the body 481. A cam 498 formed on the yoke 495 engages a roller 499 rotatably mounted in the bifurcated end 501 of a plunger 502 slidable in the body first to urge and then to hold the plunger and the upper jaw 482 downwardly. A lift plunger 511 secured to the lower jaw 483 extends downwardly through the body 481 and the associated $x$-slide bar 301 of the compound slide 110. To move the lower jaw, the lift plunger 511 bears on a wedge plate 513 adjustably fixed in the bed plate 68, and provided with surface 517 inclined in the x-direction so that the jaw is elevated, against the spring 484, as the device is moved toward the stock, to the right as seen in FIG. 8 and permits the spring 484 to move the jaws apart in response to movement away from the stock, to the left as seen in FIG. 8.

To accommodate the wedge plates 513, a cavity 515 is sunk below the surface 70 of the bed plate beneath the compound slide 110 which carries the associated bending device. Each cavity and the wedge plate therein are of sufficient width in the y-direction to accommodate the plunger 511 any position to which the bending device may be moved. The location in the x-direction of the inclined surface 517 of the wedge plate 513 can be adjusted by the screw 521 in order precisely to locate the lower jaw elevation with respect to the lower surface of the blade. The plate is biased toward the adjusting screw 521 by a spring 523.

In the device 92a, the bending finger 485 is formed integrally on a shaft 531 which carries a pinion 532 corotatably thereon. The shaft 531 is supported in the body 481 for rotation about an axis parallel to the associated x-axis and at an elevation relative to the stock suitable for forming a bend of a preselected standard radius. In order to rotate the shaft and the bending finger 485 the actuating plunger 465, which is moved downwardly by the auxiliary ram 453 and upwardly by a return spring 533, carries a rack 534 meshing with the pinion 532. In FIG. 10, the rack 534 (shown in full line) and pinion mesh at the right of the pinion illustrating a mechanism for rotating the finger 485a clockwise to bend a blade downwardly with respect to the plane of the stock. In FIG. 10, the rack 534', phantom outline, engages the left side of the pinion 532' so that the mechanism operates to rotate the finger 485b counterclockwise to form a bend in the blade upward relative to the plane of the stock. The bending device 92 may take either of the two alternative forms 92a, 92b thus described and can readily be interchanged with respect to the relative stations (a, b) seen in FIG. 6.

Cyclic Lateral Movement of Subpresses

Referring to FIGS. 5, 6, and 7; in the apparatus in accordance with the invention, the bending devices 92a, 92b and the blade cutoff unit 125 can be moved in cyclically timed relation with the ram 60, laterally of the stock, which is to say in the x-direction, between a forward position (as seen in full line, FIG. 7), in which the respective bending device and cutoff are in operative blade forming relation with the stock on the carrier 80, and a rearward position (shown in phantom, FIG. 7), in which the respective blade bending device or cutoff is spaced laterally away from the stock. To effect the laterally cyclic movement thus described, the mechanism 550 associated with each of the units 92a, 92b and 125 comprises a double-acting air cylinder 551 fixed on the frame 96 so that its piston rod 552 travels in the x-direction to move the respectively associated subpress. A block 553 having a T-slot extending parallel to the y-axis is secured to the piston rod 552, and a rod 554 having its T-head retained slidably in the slot of the block 553 is secured to the subpress unit. A guide block 555 secured on the bed plate 68 prevents rotation of the block 553 about the axis of the cylinder 551 to keep the length of each T-slot parallel to the y-axis and allow the T-head to be retained therein. The respective cylinders 551 are connected by way of conventional valves (not shown) to a supply of compressed air. In response to appropriate command signals, the valves controlling the respective cylinders 551 are operated in timed relation with the main ram 60 so that the associated bending device or cutoff unit is positioned rearwardly out of blade-forming or cutoff relation with the stock on the carrier 80 during its movement, and is moved forward to its operating relation with the stock while the stock is held stationary by the carrier and while the main and auxiliary press rams are actuated to work the stock at the respective stations.

It is to be noted also that the lateral cyclic movement just described is effective to actuate the lower jaw 483 of the respective bending device by moving the lift plunger 511 relative to the inclined surface 517 of the wedge plate 513 as the bending device is moved by its cylinder 551.

The subpress units for bending and for blade cutoff do not require precise location in the x-direction, hence the program which provides signals for movement of the x-direction slides can be omitted with respect to the bending devices and the blade cutoff. The positioner mechanism traveler 401, however, is operated to move the y-slide bar in the manner which has been described to locate the, or each bending device, or the cutoff subpress to an appropriate y equals $y_n$ location.

Operation

In use, the apparatus is capable of making many different styles and models of blades for tire curing molds. By conventional and well-known techniques, a program is prepared on 8-channel tape for each style of blade required. A single tape can accommodate a complete program for more than one style of blade. The prepared tape is mounted in the tape reader of the numerical control unit 42. The main ram 60 is raised to (and secured for safety by a safety block 61) in its up position 60'. The subpress units 75 are thereby released for movement. The collector plate 335 and the collector bar 365 are both actuated, preferably simultaneously, so that each subpress unit, 75, as well as 92a, 92b and 125, is moved to its home position wherein the respective locator pins 115 are in contact with the x and y-locating sides 341, 343 of the respective openings 331 in the bed plate 68 (see FIG. 5). Movements of the collector plate and collector bar can be made responsive to signals in the program or effected in response to manual pushbutton control. The tape reader then interrogates the tape and communicates successive command signals of the program to the positioner mechanism 100 to rotate the motor 420 and the screw 417 so as to move the traveler 401 to engage the compound slide 110 of a selected subpress, for example, the blade cutoff 125. The scrap cutoff unit is fixed on the bed plate. The latch plate cylinder 433 is actuated, moving the plate 421 and pins 422 to latch in the sockets 317 in the y-bar 303 of the selected compound slide 110. The screw 417 is then rotated through a predetermined angle so as to move the traveler 401 together with the selected slide 110 and the subpress unit thereon to the new position y equals $y_n$ prescribed by the program. At the same time, the x-slide motor 440 is actuated to extend the x-screw 447 so as to abut and slide the x-slide 301 and the subpress unit into its designated new position, $x$ equals $x_n$. At a signal from the tape, the latch plate 421 is raised, disengaging the pins 422, and the $x$-screw 446 is retracted, whereupon the traveler 401 is moved to a next selected slide 110 and subpress unit and the positioning procedure described is repeated, each step being in response to the prepared program in the control unit 42.

If desired, while the ram 60 and beam 72 are raised, certain of the subpress units can be interchanged in or removed from the array of 18 shown in FIG. 1. Each subpress unit can readily be lifted from its locating surface 321 and locating dowels 323 or replaced thereon without additional fastening.

One of the principal advantages of the apparatus lies in the fact that the repositioning of each of the subpress units is controlled automatically in response to the program on the tape in the tape reader of the N/C unit 42. The resetting of each of the subpress units to a new position in accordance with a new program is very rapid and can be accomplished in, for example, 2 minutes or less. The operator, therefore, can (if a supply of stock is not already in place), while such repositioning is being effected, place a coil 22 of selected blade-making stock on the supply stand 26, pass the free end thereof through the straightener 30 into the supply loop 33 beneath the dance roll 35, thence through the nip of the pinch rolls 251 between the guide rolls 253 and into the S-shaped channel 257. As has been pointed out, the blade-making stock 24 is punched along one edge with a uniformly spaced row of holes 40, which will be engaged progressively by register pins 207 on the segments 203 of the carrier 80. The operator has only to ease the free end of the stock along the channel so that one of the holes 40 will engage one of the pins 207 on the carrier. The carrier 80 then holds, controls, and will move the stock 24 stepwise to the subpress units 75. As the carrier 80 is advanced, successive holes 40 in the stock 24 engage the corresponding successive pins 207 as the stock is drawn from the supply loop 33.

Upon completion of the positioning of each of the selected subpress units, the safety block B being removed, the press ram 60 is lowered through its primary stroke placing the punch-operating beam 72 in its position 72' to engage the subpress units 74, as seen in FIG. 4, with sufficient pressure to retain the units 75 in their operative positions. At this stage, the punch holders 75a and the die holders 75b are so spaced that the punches do not move into the dies nor does such primary stroke operate to blank the stock which remains to the left of the first subpress unit 75-1 as seen in FIG. 1.

In the making of blades the style of which requires the blanked out blade to be bent, the operator will adjust the angle of the bent portion of the blade with respect to the original plane thereof by rotating the graduated collar 459 so as to adjust the crosshead 455 and thereby the stroke of the plunger 465 which rotates the bending finger 485. He may also manually adjust the screw 521 to reset the wedge plate 513 position to suit the thickness of the material. The apparatus is then ready to produce the specific style of blade programmed on the tape.

To advance the stock step by step, a preselected pulse count is manually set in the Indexer and provides a specific rotation of the motor 283 driving the carrier 80. The carrier thereby is advanced a predetermined amount suited to the particular blade style and stopped.

The carrier 180, being stopped, is held, holding the stock in the throat 235 of the first subpress unit 75-1. The main ram is then stroked downwardly moving the beam 72 from the holding position (shown in FIG. 4) a sufficient distance to operate the punch and die units 76. The auxiliary presses 94, 130, 140 are simultaneously stroked downwardly, operating the bending and cutoff units. The first unit 75-1 blanks out a portion of a blade and the rams are stroked upwardly withdrawing the punches from the dies. The carrier 80 is again advanced in response to the Indexer of unit 42, placing the first blade at the next selected subpress unit and the down and up stroke are repeated, the carrier 80 and stock 24 being advanced step by step, thus progressing through the sequence of subpress units in the manner analogous to the operation of a conventional progressive die machine. When the first blade at the free end of the stock arrives in a position at the blade cutoff subpress unit 125, the blade, now completely blanked out and formed, is cut off from the stock 24 and is dropped by way of a chute (not shown) into a convenient receptacle. The remaining strip moves on with the carrier 80 and is then disengaged from the guide by the S-shaped exit channel 270. As previously indicated, the now scrap strip can be cut into manageable pieces by periodic operation of the scrap cutoff subpress unit 135 which operates in timed relation with the oscillation of the main ram 60 but need not operate at every stroke thereof.

The infeed cutoff severs the stock 24 in the reach thereof between the pinch roll nip 251 and the infeed channel 257. That portion of the stock which is engaged with the carrier 80 continues to be advanced stepwise through the machine to complete blanking out of the last blade thereon, after which the main ram is raised to its up position (and blocked) and the described sequence can immediately be repeated to set up for another style of blade. Unless the stock 24 need be changed, the leading end of it which is held by the pinch rolls 251, can be entered manually into the channel 257, as before, in preparation for making a next lot of blades.

During each movement of the carrier 80, the bending devices 92 and the blade cutoff subpress unit 125 are free to move forward and back as seen in FIG. 7, in the $x$-direction, between an operative position for bending or cutting off respectively of the blade and an inoperative rearward position spaced away from the stock. In this way each movement of the stock is made without interference between an already bent portion of a blade and the subpress unit 94b or 125.

The positioner mechanism 100 remains idle during the production of a quantity or lot of a particular style of blade. At the completion of the production run of such lot, the mechanism 100 is promptly available to reposition, for a subsequent style, all or any of the subpress units to suit the form and dimensions of such subsequent style. Hence, the set-up time for each style of blade is reduced to something less than two minutes and the total production of the apparatus is thereby greatly enhanced.

The use of the endless loop carrier to hold and to convey the stock stepwise along a series of subpress units enables full use of the length of stock input to the machine and by resisting the tendency of such stock to curl when being progressively blanked out avoids jamming such as sometimes occurs in progressive die machines employing conventional fixed stock guides. Each blade during its blanking out and bending operations is under complete and relatively independent control by the carrier 80.

The provision of an auxiliary press to operate the bending device affords convenient and readily accessible adjustment of stroke so that the angle of bend can be readily adjusted within close limits without the need for excessive die try-out time.

By mounting each of the subpress units on a compound slide each of which is slidably positioned on the bed plate, each subpress unit is readily adjusted from its home position to a new position to suit each particular blade style produced without necessity for the use of templates and manual adjustment or extraneous individual clamping. The subpress units are readily held in their new locations by the punch holder beam.

By providing the collector plate and collector bar mechanisms to restore the subpress units to their respective home positions, the program required for numerically controlled positioning of the subpress units is much simplified and the positioner mechanism is enabled readily to find respective subpress units when making a new set-up in the apparatus.

While certain representative embodiments and details have been shown for the purpose of illustrating the invention, it will be apparent to those skilled in the art that various changes and modifications may be made therein without departing from the spirit or scope of the invention.

What is claimed is:

1. The method of making blades for tire curing molds in a press having a plurality of subpresses located therein for progressively blanking out said blades from a running length of stock comprising locating each of said subpress units in a respective predetermined home position in the press, moving selected ones of said subpress units from said respective home position each to a preselected second position relative to said stock in response to a program of command signals carried by a numerical control tape, partially closing said press to secure said subpress units in their respective second positions, and then operating said press and the subpress units held thereby progressively to blank out blades from said stock.

2. A method as claimed in claim 1 further comprising interengaging a movable positioner and one of said subpress units, actuating said positioner in response to command signals to move said one subpress unit to said second position independently of any others of said subpress units.

3. Method of making blades for tire curing molds in a press having a plurality of subpresses located therein for progressively blanking out said blades from a running length of blade making stock wherein said subpress units include at least one bending device having a rotatable blade bending finger, progressively blanking out blades from said stock, and before cutting off such blanked out blades from said stock, engaging each said blade and said finger and rotating said finger to bend each such blade a preselected amount.

4. A method as claimed in claim 3 further comprising moving said bending device into operational bending relation with said stock and away from such relation during each cycle of operation of the press.

5. Apparatus for making blades for tire curing molds from running length strip metal stock, the apparatus comprising a press having a main ram, a bed plate fixed beneath said ram, a frame mounted on said bed plate, a plurality of subpress units carried on said bed plate and actuated by movement of said main ram toward said bed plate; an endless carrier mounted on said press for movement along a closed path to hold said stock for operations thereon by said units and to move said stock between said operations; a positioner mechanism mounted on said press and operable selectively to move at least one of said units from one to another predetermined position relative to said ram and said carrier; at least one auxiliary press mounted on said frame having an auxiliary ram operable in timed relation with said main ram, a subpress unit slidably carried by said bed plate and operable by said auxiliary ram for forming a blade; a plurality of compound slides each slidably supported on said bed plate and each slide carrying one of said subpress units, each of said slides being slidable independently of the others of said slides; and a locating element fixedly associated with each of said subpress units, a collector mechanism mounted in said press and movable to engage and to move each said locating element and its respectively associated subpress unit to a predetermined home position on said bed plate.

6. Apparatus for making blades for tire curing molds from running length strip metal stock, the apparatus comprising, a press having a main ram, a bed plate fixed beneath said ram, a frame mounted on said bed plate, a plurality of subpress units carried on said bed plate and actuated by movement of said main ram toward said bed plate; an endless carrier mounted on said press for movement along a closed path to hold said stock for operations thereon by said units and to move said stock between said operations.

7. Apparatus as claimed in claim 6, said carrier comprising a multiplicity of stock engaging segments arranged in end-to-end relation, and a rigid rail extending along a portion of said path in supporting relation to said segments.

8. Apparatus as claimed in claim 7, each of said segments having at least one stock engaging register pin fixed thereon, each such pin being adapted to enter a corresponding hole in the stock.

9. Apparatus as claimed in claim 7, a rigid S-curved channel fixed in said press for guiding said stock into engagement with said segments.

10. Apparatus as claimed in claim 7, a rigid S-curved channel fixed in said press for guiding said stock in disengagement from said segments.

11. Apparatus as claimed in claim 7, a pair of sprockets mounted in said press for rotation about parallel axes perpendicular to the plane of said closed path, said sprockets drivably engaging said segments adjacent respectively opposite ends of said rail, and a driving motor connected to drive one of said sprockets.

12. Apparatus as claimed in claim 11, a hold down bar mounted in said press parallel to said rail and resiliently urged toward said rail while said segment and stock thereon move between said bar and rail.

13. Apparatus as claimed in claim 6, a positioner mechanism mounted on said press and operable selectively to move at least one of said units from one to another predetermined position on said bed plate relative to said ram and said carrier.

14. Apparatus as claimed in claim 13, said carrier comprising a multiplicity of stock engaging segments arranged in continuous end-to-end relation, and a rigid rail extending along a portion of said path in supporting relation to said segments; and each of said segments having at least one stock engaging register pin fixed thereon, each such pin being adapted to enter a corresponding hole in the stock.

15. Apparatus as claimed in claim 13, said mechanism comprising a traveler mounted for movement into operating relation with selected ones of said units and to move each of said ones from said one to another position; and a plurality of tracks fixed on said frame to carry said traveler in movement parallel to the direction of movement of said carrier, said traveler having a latching device for cooperative connection with successively selected ones of said units.

16. Apparatus as claimed in claim 14, a plurality of tracks fixed on said frame to carry said traveler in movement parallel to the direction of movement of said carrier, said traveler having a latching device for cooperative connection with selected ones of said units; said traveler including a nut fixed thereto, a screw mounted rotatably on said frame in driving engagement with said nut, a motor connected to rotate said screw to move said traveler along said tracks; and said traveler further including a second screw movable longitudinally of itself perpendicularly to the direction of movement of said traveler, a second nut engaging said second screw, and a second motor operable to rotate said second nut so as to move the second screw therein.

17. Apparatus as claimed in claim 15, a pair of sprockets mounted in said press for rotation about parallel axes perpendicular to the plane of said closed path, said sprockets drivably engaging said segments adjacent respectively opposite ends of said rail, a driving motor connected to drive one of said sprockets; and a hold down bar mounted in said press parallel to said rail and resiliently urged toward said rail while said segments, and stock thereon move between said bar and rail.

18. Apparatus as claimed in claim 13, at least one auxiliary press mounted on said frame having an auxiliary ram operable in timed relation with said main ram, a subpress unit slidably carried by said bed plate and operable by said auxiliary ram for forming a blade.

19. Apparatus as claimed in claim 18, a cylinder fixed on said frame having a piston rod connected to the last named subpress to move the same transversely of the direction of movement of said auxiliary ram during each cycle of operation thereof into and out of operational blade forming relation with said stock; the last mentioned subpress unit comprising a blade bending device, including a body, an upper jaw and a lower jaw mounted in said body at least one of which jaws is slidable in said body, a shaft carrying a corotatable pinion thereon mounted rotatably in said body and a blade bending finger cooperable with said jaws to bend a blade, a plunger having a rack thereon in mesh with said pinion and mounted slidably in said body for actuation by said auxiliary ram to rotate said finger.

20. Apparatus as claimed in claim 19, a crosshead mounted in said frame between said auxiliary ram and said plunger and movable with said auxiliary ram, said crosshead including a member attached to said ram, a member engageable with said plunger, and a threaded collar disposed between and threadably attached to each said member for adjusting the distance therebetween.

21. Apparatus as claimed in claim 18, a longitudinally adjustable wedge secured in said bed plate in association with said blade bending device, a lift rod attached to said lower jaw and extending downwardly of said jaw and said body to contact said wedge, said lift rod and said lower jaw being adjusted in elevation in response to movement of said device relatively of said wedge.

22. Apparatus as claimed in claim 18, a plurality of compound slides each slidably supported on said bed plate and each carrying one of said subpress units, each of said slides being slidable independently of the others of said slides.

23. Apparatus as claimed in claim 22, each said compound slide comprising an $x$-slide member and a $y$-slide member, at least one guide fixed in said frame and extending parallel to the direction of movement of said stock, said $y$-slide member having guide surfaces slidably engaging said guide and a keyway extending perpendicularly of said guide, said $x$-slide member having a plane surface slidable on said bed plate and a key slidable in said keyway.

24. Apparatus as claimed in claim 23, each said $x$-slide member having a subpress locating surface for freely receiving thereon and releasing therefrom a selected one of said subpress units.

25. Apparatus as claimed in claim 24, a clamp carried by at least one said $y$-slide member and operable to clamp such one $y$-slide member to said guide.

26. Apparatus as claimed in claim 18, a locating element fixedly associated with each of said subpress units, a collector mechanism mounted in said press and movable to engage and to move each said element and its respectively associated subpress unit to a predetermined home position on said bed plate.

27. Apparatus as claimed in claim 26, said mechanism including a collector plate mounted slidably below the surface of said bed plate; said bed plate having a plurality of apertures each having an $x$-locating side and a $y$-locating side, each said element comprising a locating pin extending freely through a respectively associated one of said apertures; said collector plate having a plurality of openings each accommodating one of said locating pins and each opening having a surface engageable, on movement of said collector plate, with one of said pins to move the same into contact with one of said $x$- and $y$-locating sides.

28. Apparatus as claimed in claim 27, said mechanism further including a collector bar extending parallel to the direction of movement of said stock and mounted for movement perpendicularly thereto, a second element fixedly associated with each of said subpress units and collectively engageable by said collector bar for movement thereby of said subpress units to move the respective locating pins thereon to contact the respective said $x$-locating sides.

29. Apparatus as claimed in claim 13, a plurality of compound slides each slidably supported on said bed plate and each carrying one of said subpress units, each of said slides being slidable independently of the others of said slides.

30. Apparatus as claimed in claim 29, each said compound slide comprising an $x$-slide member and a $y$-slide member, at least one guide fixed in said frame and extending parallel to the direction of movement of said carrier, said $y$-slide member having guide surfaces slidably engaging said guide, and a keyway extending perpendicularly of said guide bar, said x-slide member having a plane surface slidable on said bed plate and a key slidable in said keyway.

31. Apparatus as claimed in claim 30, a clamp carried by at least one said y-slide member and operable to clamp the associated y-slide member to said guide; and each said x-slide member having a subpress locating surface for freely receiving thereon and releasing therefrom a selected one of said subpress units.

32. Apparatus as claimed in claim 29, a locating element fixedly associated with each of said subpress units, a collector mechanism mounted in said press and movable to engage and to move each said element and its respectively associated subpress unit to a predetermined home position on said bed plate.

33. Apparatus as claimed in claim 32, said mechanism including a collector plate mounted slidably below the surface of said bed plate; said bed plate having a plurality of apertures each having an x-locating side and a y-locating side, each said locating element comprising a locating pin extending freely through a respectively associated one of said openings; said collector plate having a plurality of openings each accommodating one of said locating pins, each opening having a surface engageable, on movement of said collector plate, with one of said pins to move the same into contact with one of said x- and y-locating sides; said mechanism further including a collector bar extending parallel to the direction of movement of said stock and mounted for movement perpendicularly thereto, a second element fixedly associated with each of said subpresses and collectively engageable by said collector bar for movement thereby of said subpress units and the respective locating pins thereon to contact the respective said x-locating sides.

34. Apparatus as claimed in claim 13, a locating element fixedly associated with each of said subpress units, a collector mechanism mounted in said press and movable to engage and to move each said element and its respectively associated subpress unit to a predetermined home position on said bed plate.

35. Apparatus as claimed in claim 6, at least one auxiliary press mounted on said frame having an auxiliary ram operable in timed relation with said main ram, and a subpress unit slidably carried by said bed plate and operable by said auxiliary ram for forming a blade.

36. Apparatus as claimed in claim 35, a cylinder fixed on said frame having a piston rod connected to the last named subpress to move the same transversely of the direction of movement of said auxiliary ram during each cycle of operation thereof into and out of operational blade forming relation with said stock; the last mentioned subpress unit comprising a blade bending device, including a body, an upper jaw and a lower jaw mounted in said body at least one of which jaws is slidable in said body, a shaft carrying a corotatable pinion thereon mounted rotatably in said body and a blade bending finger cooperable with said jaws to bend a blade, a plunger having a rack thereon in mesh with said pinion and mounted slidably in said body for actuation by said auxiliary ram to rotate said finger.

37. Apparatus as claimed in claim 35, a crosshead mounted in said frame between said auxiliary ram and said plunger and movable with said auxiliary ram, said crosshead including a member attached to said ram, a member engageable with said plunger, and a threaded collar disposed between and threadedly attached to each said member for adjusting the distance therebetween.

38. Apparatus as claimed in claim 36, said carrier comprising a multiplicity of stock engaging segments arranged in continuous end-to-end relation, and a rigid rail extending along a portion of said path in supporting relation to said segments; each of said segments having at least one stock engaging register pin fixed thereon, each such pin being adapted to enter a corresponding hole in the stock; and a pair of sprockets mounted in said press for rotation about parallel axes perpendicular to the plane of said closed path, said sprockets drivably engaging said elements adjacent respectively opposite ends of said rail, a driving motor connected to drive one of said sprockets; and a longitudinally adjustable wedge secured in said bed plate in association with said blade bending device, a lift rod attached to said lower jaw slidably in said body, and extending downwardly of said jaw and said body to contact said wedge, said lift rod and said lower jaw being adjusted in elevation in response to movement of said device relatively of said wedge.

39. Apparatus as claimed in claim 35, a plurality of compound slides each slidably supported on said bed plate and each carrying one of said subpress units, each of said slides being slidable independently of the others of said slides.

40. Apparatus as claimed in claim 39, each said compound slide comprising an x-slide member and a y-slide member, at least one guide fixed in said frame and extending parallel to the direction of movement of said stock, said y-slide member having guide surfaces slidably engaging said guide, and a keyway extending perpendicularly of said guide, said x-slide member having a plane surface slidable on said bed plate and a key slidable in said keyway; each said x-slide member having a subpress locating surface for freely receiving thereon and releasing therefrom a selected one of said subpress units.

41. Apparatus as claimed in claim 39, a locating element fixedly associated with each of said subpress units, a collector mechanism mounted in said press and movable to engage and to move each said element and its respectively associated subpress unit to a predetermined home position on said bed plate.

42. Apparatus as claimed in claim 41, said mechanism including a collector plate mounted slidably below the surface of said bed plate; said bed plate having a plurality of apertures each having an x-locating side and a y-locating side, each said locating element comprising a locating pin extending freely through a respectively associated one of said apertures; said collector plate having a plurality of openings each accommodating one of said locating pins, each opening having a surface engageable, on movement of said collector plate, with one of said pins to move the same into contact with one of said x- and y-locating sides.

43. Apparatus as claimed in claim 36, a locating element fixedly associated with each of said subpress units, a collector mechanism mounted in said press and movable to engage and to move each said element and its respectively associated subpress unit to a predetermined home position on said bed plate; said mechanism including a collector plate mounted slidably below the surface of said bed plate; said bed plate having a plurality of apertures each having an x-locating side and a y-locating side, each said element comprising a locating pin extending freely through a respectively associated one of said apertures; said collector plate having a plurality of openings each accommodating one of said locating pins, each opening having a surface engageable, on movement of said collector plate, with one of said pins to move the same into contact with one of said $x$- and $y$-locating sides.

44. Apparatus as claimed in claim 6, a plurality of compound slides each slidably supported on said bed plate and each carrying one of said subpress units, each of said slides being slidable independently of the others of said slides.

45. Apparatus as claimed in claim 44, each said compound slide comprising an $x$-slide member and a $y$-slide member, at least one guide fixed in said frame and extending parallel to the direction of movement of said stock, said $y$-slide member having guide surfaces slidably engaging said guide, and a keyway extending perpendicularly of said guide, said $x$-slide member having a plane surface slidable on said bed plate and a key slidable in said keyway; a clamp carried by at least one said $y$-slide member and operable to clamp the associated $y$-slide member to said guide bar.

46. Apparatus as claimed in claim 45, each said $x$-slide member having a subpress locating surface for freely receiving thereon and releasing therefrom a selected one of said subpress units.

47. Apparatus as claimed in claim 44, a locating element fixedly associated with each of said subpress units, a collector mechanism mounted in said press and movable to engage and to move each said element and its respectively associated subpress unit to a predetermined home position on said bed plate.

48. Apparatus as claimed in claim 6, a locating element fixedly associated with each of said subpress units, a collector mechanism mounted in said press and movable to engage and to move each said element and its respectively associated subpress unit to a predetermined home position on said bed plate.

49. Apparatus as claimed in claim 48, said mechanism including a collector plate mounted slidably below the surface of said bed plate; said bed plate having a plurality of apertures each having an $x$-locating side and a $y$-locating side, each said element comprising a locating pin extending freely through a respectively associated one of said apertures; said collector plate having a plurality of openings each accommodating one of said locating pins, each opening having a wall engageable, on movement of said collector plate, with one of said pins to move the same into contact with one of said $x$- and $y$-locating sides; said mechanism further including a collector bar extending parallel to the direction of movement of said stock and mounted for movement perpendicularly thereto, a second element fixedly associated with each of said subpresses and collectively engageable by said collector bar for movement thereby of said subpress units and the respective locating pins thereof to contact the respective said $x$-locating sides.

50. Apparatus for making blades for tire curing molds from running length strip metal stock, the apparatus comprising a press having a main ram, a bed plate fixed beneath said ram, a frame mounted on said bed plate, a plurality of subpress units carried on said bed plate and actuated by movement of said main ram toward said bed plate; a positioner mechanism mounted on said press and operable selectively to move at least one of said units from one to another predetermined position relative to said ram and said stock, a plurality of tracks fixed on said frame to carry said traveler in movement parallel to the direction of movement of said stock; said traveler having a latching device for cooperative connection with selected ones of said units.

51. Apparatus as claimed in claim 50, said traveler including a nut fixed thereto, a screw mounted rotatably on said frame in driving engagement with said nut, a motor connected to rotate said screw to move said traveler along said tracks; said traveler further including a second screw movable longitudinally of itself perpendicularly to the direction of movement of said traveler, a second nut engaging said second screw, and a second motor operable to rotate said second nut so as to move the second screw therein.

52. Apparatus as claimed in claim 50, at least one auxiliary press mounted on said frame having an auxiliary ram operable in timed relation with said main ram, a subpress unit slidably carried by said bed plate, and operable by said auxiliary ram for forming a blade.

53. Apparatus as claimed in claim 52, a cylinder fixed on said frame having a piston rod connected to the last named subpress to move the same transversely of the direction of movement of said auxiliary ram during each cycle of operation thereof into and out of operational blade forming relation with said stock.

54. Apparatus as claimed in claim 53, a cross-head mounted in said frame between said auxiliary ram and said plunger and movable with said auxiliary ram, said crosshead including a member attached to said ram, a member engageable with said plunger, and a threaded collar disposed between and threadedly attached to each said member for adjusting the distance therebetween.

55. Apparatus as claimed in claim 54, the last mentioned subpress unit comprising a blade bending device, including a body, an upper jaw and a lower jaw mounted in said body at least one of which jaws is slidable in said body, a shaft carrying a corotatable pinion thereon mounted rotatably in said body and a blade bending finger cooperable with said jaws to bend a blade, a plunger having a rack thereon in mesh with said pinion mounted slidably in said body for actuation by said auxiliary ram to rotate said finger.

56. Apparatus as claimed in claim 55, a longitudinally adjustable wedge secured in said bed plate in association with said blade bending device, a lift rod attached to said lower jaw and extending downwardly of said jaw and said body to contact said wedge, said lift rod and said lower jaw being adjusted in elevation in response to movement of said device relatively of said wedge.

57. Apparatus as claimed in claim 54, the last mentioned subpress unit comprising a blade cut-off.

58. Apparatus as claimed in claim 52, a plurality of compound slides each slidably supported on said bed plate and each carrying one of said subpress units, each of said slides being slidable independently of the others of said slides.

59. Apparatus as claimed in claim 58, each said compound slide comprising an $x$-slide member and a $y$-slide member, at least one guide fixed in said frame and extending parallel to the direction of movement of said stock, said $y$-slide member having guide surfaces slidably engaging said guide, and a keyway extending perpendicularly of said guide, said $x$-slide member having a plane surface slidable on said bed plate and a key slidable in said keyway; each said x-slide member having a subpress locating surface for freely receiving thereon and releasing therefrom a selected one of said subpress units.

60. Apparatus as claimed in claim 58, a locating element fixedly associated with each of said subpress units, a collector mechanism mounted in said press and movable to engage and to move each said element and its respectively associated subpress unit to a predetermined home position on said bed plate.

61. Apparatus as claimed in claim 60, said mechanism including a collector plate mounted slidably below the surface of said bed plate; said bed plate having a plurality of apertures each having an x-locating side and a y-locating side, each said element comprising a locating pin extending freely through a respectively associated one of said apertures; said collector plate having a plurality of openings each accommodating one of said locating pins, each having a wall engageable, on movement of said collector plate, with one of said pins to move the same into contact with one of said x- and y-locating sides; said mechanism further including a collector bar extending parallel to the direction of movement of said stock and mounted for movement perpendicularly thereto, a second element fixedly associated with each of said subpresses and collectively engageable by said collector bar for movement thereby of said subpress units and the respective locating pins thereon to contact the respective said x-locating sides.

62. Apparatus as claimed in claim 52, a locating element fixedly associated with each of said subpress units, a collector mechanism mounted in said press and movable to engage and to move each said collection element and its respectively associated subpress unit to a predetermined home position on said bed plate.

63. Apparatus as claimed in claim 50, a plurality of compound slides each slidably supported on said bed plate and each carrying one of said subpress units, each of said slides being slidable independently of the others of said slides; each said compound slide comprising an x-slide member and a y-slide member, at least one guide fixed in said frame and extending parallel to the direction of movement of said stock, said y-slide member having guide surfaces slidably engaging said guide, and a keyway extending perpendicularly of said guide, said x-slide member having a plane surface slidable on said bed plate and a key slidable in said keyway.

64. Apparatus as claimed in claim 63, a locating element fixedly associated with each of said subpress units, a collector mechanism mounted in said press and movable to engage and to move each said element and its respectively associated subpress unit to a predetermined home position on said bed plate.

65. Apparatus as claimed in claim 50, a locating element fixedly associated with each of said subpress units, a collector mechanism mounted in said press and movable to engage and to move each said element and its respectively associated subpress unit to a predetermined home position on said bed plate.

66. Apparatus for making blades for tire curing molds from running length strip metal stock, the apparatus comprising, a press having a main ram, a bed plate fixed beneath said ram, a frame mounted on said bed plate, a plurality of subpress units carried on said bed plate and actuated by movement of said main ram toward said bed plate; at least one auxiliary press mounted on said frame having an auxiliary ram operable in timed relation with said main ram, a subpress unit slidably carried by said bed plate, and operable by said auxiliary ram for forming a blade.

67. Apparatus as claimed in claim 66, a cylinder fixed on said frame having a piston rod connected to the last named subpress unit to move the same transversely of the direction of movement of said auxiliary ram during each cycle of operation thereof into and out of operational blade forming relation with said stock.

68. Apparatus as claimed in claim 67, a crosshead mounted in said frame between said auxiliary ram and said plunger and movable with said auxiliary ram, said crosshead including a member attached to said ram, a member engageable with said plunger, and a threaded collar disposed between and threadedly attached to each said member for adjusting the distance therebetween.

69. Apparatus as claimed in claim 68, the last mentioned subpress unit comprising a blade bending device, including a body, an upper jaw and a lower jaw mounted in said body at least one of which jaws is slidable in said body, a shaft carrying a corotatable pinion thereon mounted rotatably in said body and a blade bending finger cooperable with said jaws to bend a blade, a plunger having a rack thereon in mesh with said pinion mounted slidably in said body for actuation by said auxiliary ram to rotate said finger.

70. Apparatus as claimed in claim 69, a longitudinally adjustable wedge secured in said bed plate in association with said blade bending device, a lift rod attached to said lower jaw and extending downwardly of said jaw and said body to contact said wedge, said lift rod and said lower jaw being adjusted in elevation in response to movement of said device relatively of said wedge.

71. Apparatus as claimed in claim 67, the last mentioned subpress unit comprising a blade cut-off.

72. Apparatus as claimed in claim 66, a plurality of compound slides each slidably supported on said bed plate and each carrying one of said subpress units, each of said slides being slidable independently of the others of said slides.

73. Apparatus as claimed in claim 72, each said compound slide comprising an x-slide member and a y-slide member, at least one guide fixed in said frame and extending parallel to the direction of movement of said stock, said y-slide member having guide surfaces slidably engaging said guide, and a keyway extending perpendicularly of said guide, said x-slide member having a plane surface slidable on said bed plate and a key slidable in said keyway; each said x-slide member having a subpress locating surface for freely receiving thereon and releasing therefrom a selected one of said subpress units.

74. Apparatus as claimed in claim 73, a clamp carried by at least one said y-slide member and operable to clamp the associated y-slide member to said guide bar.

75. Apparatus as claimed in claim 72, a locating element fixedly associated with each of said subpress units, a collector mechanism mounted in said press and movable to engage and to move each said element and its respectively associated subpress unit to a predetermined home position on said bed plate.

76. Apparatus as claimed in claim 66, a locating element fixedly associated with each of said subpress units, a collector mechanism mounted in said press and movable to engage and to move each said collection element and its respectively associated subpress unit to a predetermined home position on said bed plate.

77. Apparatus as claimed in claim 76, said mechanism including a collector plate mounted slidably below the surface of said bed plate; said bed plate having a plurality of apertures each having an $x$-locating side and a $y$-locating side, each said element comprising a locating pin extending freely through a respectively associated one of said apertures; said collector plate having a plurality of openings each accommodating one of said locating pins, each having a wall engageable, on movement of said collector plate, with one of said pins to move the same into contact with one of said $x$- and $y$-locating sides.

78. Apparatus for making blades for tire curing molds from running length strip metal stock, the apparatus comprising, a press having a main ram, a bed plate fixed beneath said ram, a frame mounted on said bed plate, a plurality of subpress units carried on said bed plate and actuated by movement of said main ram toward said bed plate; a plurality of compound slides each slidably supported on said bed plate and each carrying one of said subpress units, each of said slides being slidable in mutually perpendicular directions independently of the others of said slides.

79. Apparatus as claimed in claim 78, each said compound slide comprising an $x$-slide member and a $y$-slide member, at least one guide fixed in said frame and extending parallel to the direction of movement of said stock, said $y$-slide member having guide surfaces slidably engaging said guide, and a keyway extending perpendicularly of said guide, said $x$-slide member having a plane surface slidable on said bed plate and a key slidable in said keyway.

80. Apparatus as claimed in claim 79, a clamp carried by at least one said $y$-slide member and operable to clamp the associated $y$-slide member to said guide; each said $x$-slide member having a subpress locating surface for freely receiving thereon and releasing therefrom a selected one of said subpress units.

81. Apparatus as claimed in claim 78, a locating element fixedly associated with each of said subpress units, a collector mechanism mounted in said press and movable to engage and to move each said element and its respectively associated subpress unit to a predetermined home position on said bed plate.

82. Apparatus as claimed in claim 81, said mechanism including a collector plate mounted slidably below the surface of said bed plate; said bed plate having a plurality of apertures each having an $x$-locating side and a $y$-locating side, each said element comprising a locating pin extending freely through a respectively associated one of said apertures; said collector plate having a plurality of openings each accommodating one of said locating pins and each opening having a wall engageable, on movement of said collector plate, with one of said pins to move the same into contact with one of said $x$- and $y$-locating sides.

83. Apparatus for making blades for tire curing molds from running length strip metal stock, the apparatus comprising, a press having a main ram, a bed plate fixed beneath said ram, a frame mounted on said bed plate, a plurality of subpress units carried on said bed plate and actuated by movement of said main ram toward said bed plate; a locating element fixedly associated with each of said subpress units, a collector mechanism mounted in said press and movable to engage and to move each said element and its respectively associated subpress unit to a predetermined home position on said bed plate.

84. The method of making blades for tire curing molds in a press having a plurality of subpresses located therein for progressively blanking out said blades from a running length of stock comprising progressively affixing said running length of blade making stock to an endless carrier at closely spaced intervals thereon, and moving said carrier stepwise through said press progressively to blank out blades from said stock.

85. The method as claimed in claim 84 including providing said stock with a row of holes uniformly spaced therealong adjacent one edge and affixing said stock to said carrier by engaging register pins on said carrier progressively in said holes.

* * * * *

UNITED STATES PATENT OFFICE
CERTIFICATE OF CORRECTION

PATENT NO. : 3,880,020
DATED : April 29, 1975
INVENTOR(S) : Dennis W. Clem

It is certified that error appears in the above-identified patent and that said Letters Patent are hereby corrected as shown below:

Columns 3 and 4, omitted from the printed specification, are attached.

Column 13, line 44, "74" should be -- 75 --.

Column 14, line 1, "180" should be -- 80 --.

Signed and Sealed this sixteenth Day of September 1975

[SEAL]

Attest:

RUTH C. MASON
Attesting Officer

C. MARSHALL DANN
Commissioner of Patents and Trademarks